Dec. 17, 1940.   B. W. AMES   2,225,200
INSULATION STRIPPER
Filed Feb. 10, 1937

INVENTOR.
BILLY WILLIAM AMES
BY Henry Gifford Hardy.
ATTORNEY.

Patented Dec. 17, 1940

2,225,200

UNITED STATES PATENT OFFICE 2,225,200

INSULATION STRIPPER

Billy William Ames, San Francisco, Calif.

Application February 10, 1937, Serial No. 125,078

2 Claims. (Cl. 15—21)

This invention relates to a device for the stripping of insulation from wires and the like and particularly to such a device which, although capable of the requisite adjustments, is small and compact and therefore portable.

The comparatively simple operation of stripping insulation has long been regarded as a hand operation and as such has consumed many valuable hours of skilled workmen's time. To remove insulation with a scraper is a slow, tedious operation which can better be visualized when, for example, a motor winder has to prepare a 60 horse power 900 R. P. M. induction motor. This job entails the preparation of a total of 240 end connections from its 120 coils. Heretofore it has required from four to six hours to scrape the leads clean enough to be soldered depending upon whether the conductors are single, or two or more in parallel.

The effort to make this hand operation a machine operation has been the object of study in the past few years and has resulted in the production of large cumbersome, expensive machines which through structural requirements demand that the work be brought to the machine rather than taking the machine to the work. These structural limitations have greatly retarded the practical and advantageous use of such machines in all except the most specialized large scale production shops and has entirely left untouched the jobs which could not be brought to the machine or the smaller machine and repair shops where it is practically an essential that a machine of this character perform the double function of both portable and stationary operation.

It is an object of the present invention to produce a device which will accomplish each of the desirable results mentioned above and which will rapidly and efficiently remove cotton and enamel insulation of varying sizes, either square or round in section.

Such a device would be of value not only in factories where motors are made but also, among other places, where all types of coils are manufactured, in electric service shops where repair work is done and particularly in radio and telephone work.

Further objects are to provide a construction of maximum simplicity, economy and ease of assembly and such further objects, advantages and capabilities as will later more fully appear and as are inherently possessed thereby.

The invention further resides in the combination, construction and arrangement of parts illustrated in the accompanying single sheet of drawings, and while there is shown therein a preferred embodiment, it is to be understood that the same is capable of modification and change and comprehends other details and constructions without departing from the spirit or the scope of the present invention. Similar parts are designated by the same reference characters in the several views of the drawing.

Referring to the drawing.

Figure 1:
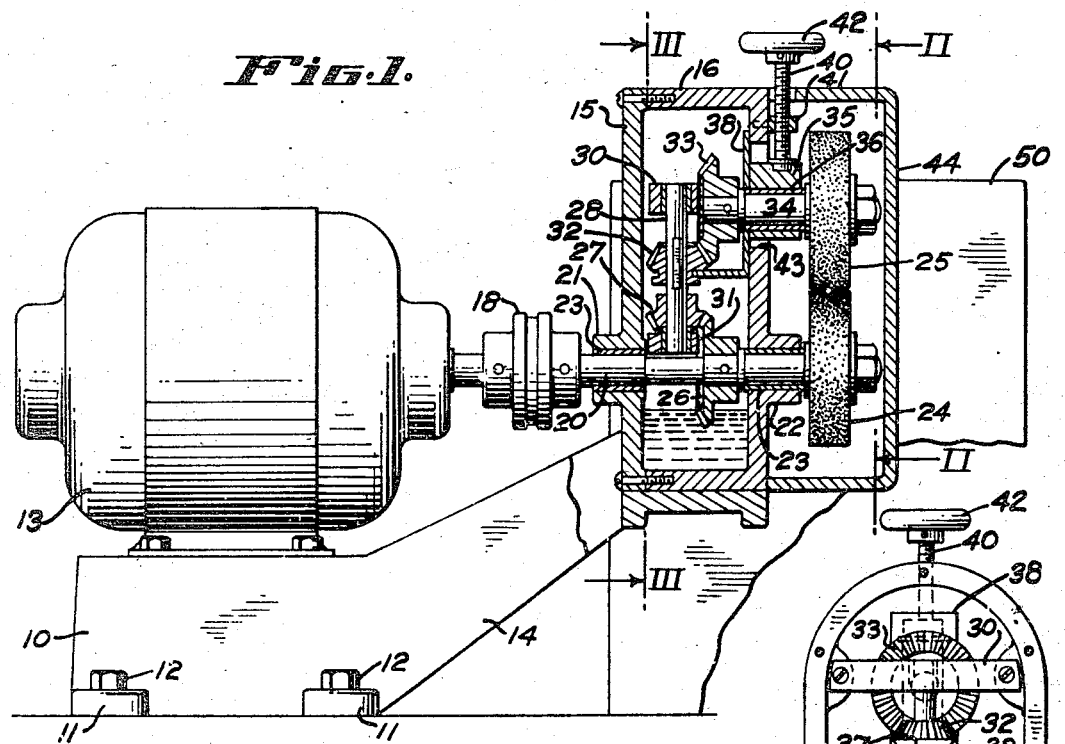
Figure 1 is a front elevation of the complete device with the gear box and drive shown in section.
Figure 3:
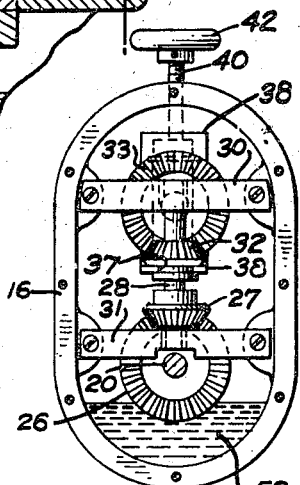
Figure 3 is a vertical section taken on the line III—III of Figure 1 looking in the direction of the arrows.

Referring now more particularly to the drawing, the completely assembled device is shown in elevational view in Figure 1. The entire device is mounted on a base 10 provided with lugs 11 by means of which the device may be secured in position by screws or bolts 12 or clamps (not shown). The base part 10 supports the motive power for driving the insulation stripper, it being understood that any kind of motive power is acceptable. The motive power in the drawing is shown as an electric motor 13 which for most purposes is the most satisfactory source of power. The base 10 is provided with an arm 14 upon which the gear box housing 15 and 16 of the device rests and to which it is secured by any suitable means here shown as machine screws 17.

The motor 13, by means of coupling 18, drives shaft 20 directly and in line. Shaft 20 passes through the gear box housing 15 and its cover portion 16 and is supported therein by concentric bosses 21 and 22 with suitable bearings. The sleeve bearings 23 here shown are provided for smooth even operation. At the opposite end of the shaft 20 there is a wire brush 24 with a solid center hub and mounted with a suitable thrust washer to take up any end-play. In order to provide another brush 25 rotating in the opposite direction from that of 24 in the same plane a chain of bevel gears is arranged. On the interior of the gear box housing there is mounted on the shaft 20 a bevel gear 26 which drives pinion 27 and rotates stub shaft 28. Stub shaft 28 is journaled in bearing supports 30 and 31 which are secured in any suitable manner at the gear box housing 16. Mounted on stub shaft 28 and rotated by it is pinion 32 driving gear 33 and rotating shaft 34 which shaft is mounted in bearing block 35 with sleeve bearing 36 or other suitable bearing. It is obvious that the shaft 34 is parallel to and in the same vertical axial plane as shaft 20. The wire brush 25 is mounted in a similar manner to brush 24 and by means of the gear train herein disclosed rotates in an opposite direction.

In order that adjustment may be made to accommodate the wear of the wire brushes 24 and 25 and also to accommodate varying sizes of wires and varying thicknesses of insulation one of the shafts is made adjustable with respect to the other. In the present embodiment of the invention the upper shaft 34 is the one which has been made adjustable. In order to accomplish this the pinion 32 is provided with a key which rides in a key way in shaft 28 and is adapted for slidable movement vertically on shaft 28 within the limits of the key way. The pinion 32 is also provided with a slot 37 in its hub in which rides the fork of an angle bracket 38 which is rigidly mounted on the bearing block 35 and is raised or lowered in accordance with the positioning of the bearing block. It will further be seen that the angle bracket 38 bears at all times and in all positions on the interior surface of the gear box housing cover 16. The vertical adjustment is regulated and maintained by the screw 40, one end of which is free to rotate within the bearing block 35 but otherwise is securely held thereto, which passes through a threaded eye 41 against which the threads of the screw 40 operate to raise or lower the bearing block 35. A suitable handle 42 is placed thereon to make the manual adjustment easy. To accommodate the maximum and minimum vertical adjustment of the shaft 34 a suitable aperture 43 is provided in the gear box housing cover 16 in which the bearing block 35 moves and is supported. It is obvious from this discussion that the sliding pinion 32 is always in perfect mesh with the bevel gear 33 mounted on shaft 34. When the gear box housing is assembled the same becomes an oil tight casing for positive lubrication.

To cover the rotating wire brushes there is likewise provided a cover-guard 44 which for convenience should be the same size and shape as the gear box housing and attached thereto in any suitable manner and when so attached all of the rotating parts are completely covered and guarded although easily accessible. The cover-guard is provided at the front with an aperture 45 for the accommodation of the insulated wires and on the opposite side with a larger aperture 46 for discharge of the stripped wire and the discharge of the insulation which has been removed in operation.

There is a suitable box 50 to receive the waste insulation which has been removed, which is held adjacent the outlet 46. On the opposite side of the box 50 there is an aperture 52 so that the stripped and cleaned wire may pass entirely through. Over the aperture 52 there is a screen 53 suitably hinged to the box at 54 so that when stripped and cleaned wire is not passing through the full length of the box, ventilation is preserved but the waste insulation will not be scattered about. In order to clean the box 50 the back is provided with a hinged portion 55 for easy accessible cleaning.

Figure 2:
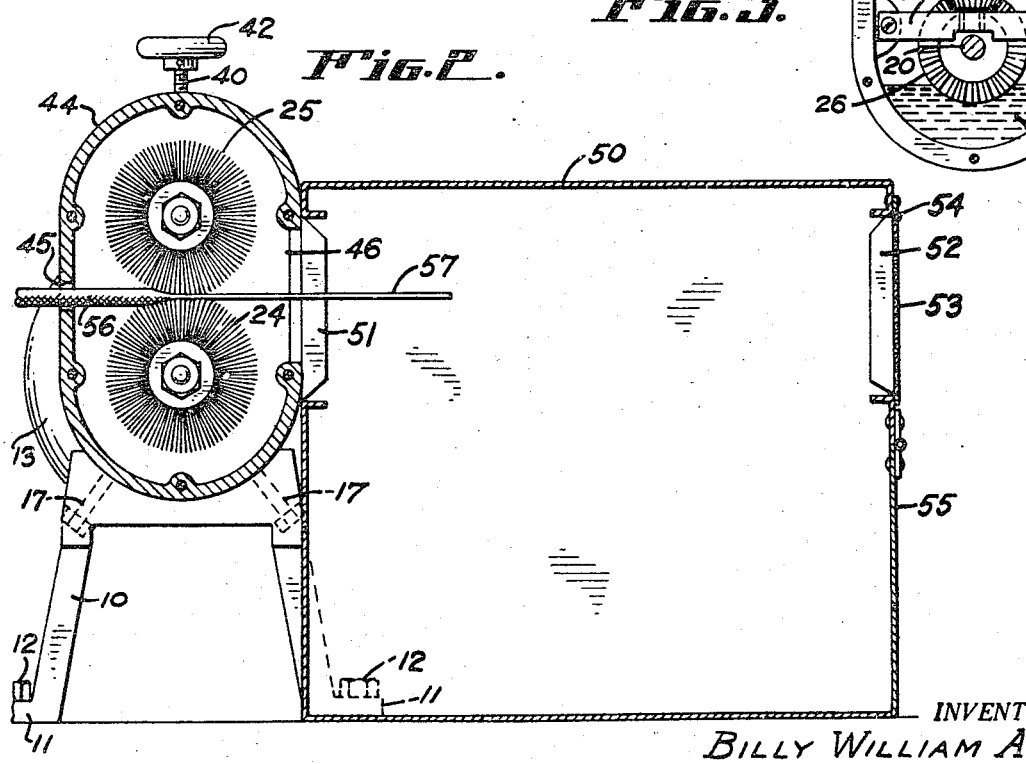
Figure 2 is an end elevation with the brush cover-guard and waste box both shown in section taken on the line II—II of Figure 1.

It is believed that the operation of the device is clear from the description. However, it should be noted that the brushes 24 and 25 turn in the opposite direction and when viewed as in Figure 2 brush 24 operates clockwise and brush 25 operates counter-clockwise. As the insulation wire 56 is passed in through the aperture 45 the brushes in there scrape the wire entirely strip and clean and the insulation or stripped material is driven off in a path similar to that of the cleaned wire 57 and passes through the aperture 46 and into the box 50 through aperture 51.

Also in the operation of the present device, the gears are constantly in a bath of oil 58 so that positive lubrication is supplied to all of the moving parts at all times.

I claim:

1. A portable unitary insulation stripping machine comprising in combination, a base member, a motor, a housing, a pair of rotatable brushes adapted to tangentially engage insulated wire there between to strip the same, a shaft journaled in said housing carrying one of said brushes and directly connected to said motor, a second stub shaft with a floating journal parallel thereto carrying the other of said brushes and adjustable with respect to said first mentioned shaft within the same vertical plane, and means mounted on and connected with said first mentioned shaft for a positive drive of the second shaft in the opposite direction, a guard formed as an extension of said housing encasing said brushes and provided with suitable openings for delivering insulated wire to the place of tangential engagement and for exhausting the waste, said motor and said housing being mounted on said base member to form a complete unitary device readily portable for immediate use.

2. A portable unitary insulation stripping machine comprising in combination, a base member, a motor, an oil tight housing, a pair of rotatable brushes adapted to make a working point where they tangentially and therebetween engage insulated wire to strip the same, a shaft journaled in said housing carrying one of said brushes and directly connected to said motor, a second stub shaft with a floating journal parallel thereto carrying the other of said brushes and adjustable with respect to said first mentioned shaft within the same vertical plane, and means mounted on and connected with said first mentioned shaft for a positive drive of the second shaft in the opposite direction and operating within said housing, a guard formed as an extension of said housing encasing said brushes and provided with suitable openings for feeding the work to the working point and for exhausting the waste, said motor and said housing being mounted on said base member to form a complete unitary device readily portable for immediate use.

BILLY WILLIAM AMES.